(12) United States Patent
Gernaat et al.

(10) Patent No.: US 12,757,867 B2
(45) Date of Patent: Oct. 13, 2026

(54) LIVESTOCK TRANSPORT IMPLEMENT

(71) Applicant: Gernaat Dairy LLC, Falmouth, MI (US)

(72) Inventors: Daren Gernaat, Marion, MI (US); Jeffrey Hamman, McBain, MI (US)

(73) Assignee: Gernaat Dairy LLC, Falmouth, MI (US)

( * ) Notice: Subject to any disclaimer, the term of this patent is extended or adjusted under 35 U.S.C. 154(b) by 364 days.

(21) Appl. No.: 18/204,790

(22) Filed: Jun. 1, 2023

(65) Prior Publication Data

US 2024/0397906 A1 Dec. 5, 2024

(51) Int. Cl.
*A01K 1/06* (2006.01)

(52) U.S. Cl.
CPC .................................. *A01K 1/0613* (2013.01)

(58) Field of Classification Search
CPC ...... A61D 3/00; A01K 1/0613; A01K 1/0017; A01K 1/0035; A01K 1/0272; A01K 1/0236; A01L 13/00; B66F 9/00; B66F 9/04
USPC .......................................... 119/512, 519, 502
See application file for complete search history.

(56) References Cited

U.S. PATENT DOCUMENTS 3,931,796 A * 1/1976 Hoffman .............. A01K 1/0613 119/512
4,195,595 A 4/1980 Shimonovich
5,331,923 A 7/1994 Mollhagen
5,372,092 A * 12/1994 Pederson ............. A01K 1/0613 119/502
5,645,016 A * 7/1997 Mahurin .............. A01K 1/0613 119/752
5,924,385 A 7/1999 Cossel
7,685,970 B1 * 3/2010 Rains ................... A01K 1/0613 119/512
11,246,294 B2 2/2022 Dyson
2015/0040834 A1 * 2/2015 Loos .................... A01K 1/0017 119/524
2019/0297840 A1 10/2019 Coulter

FOREIGN PATENT DOCUMENTS

CA 2544279 A1 * 10/2007 ........... A01K 1/0613
CN 104287860 A 1/2017
CN 109172026 A * 1/2019 ............... A61D 3/00

(Continued)

*Primary Examiner* — Katelyn T Truong
(74) *Attorney, Agent, or Firm* — Varnum LLP

(57) ABSTRACT

An implement adapted to be mounted on a self-propelled vehicle is provided for transporting an animal. The implement includes a platform defining a platform perimeter for supporting the animal thereon. An implement frame extends around the platform perimeter such that the implement frame defines a predetermined area upon the platform for positioning of the animal during a transport event. The implement frame includes an anterior frame section operable for allowing anterior access to and from the predetermined area and a gate for allowing lateral access to and from the predetermined area. A first winch assembly is operatively coupled to the implement frame for assisting with loading the animal into the predetermined area when the animal is unable to move under its own power. The implement further includes a hydraulic assembly operatively coupled to the implement frame for selectively actuating the anterior frame section and the first winch assembly.

12 Claims, 17 Drawing Sheets

(56) References Cited

FOREIGN PATENT DOCUMENTS

| | | | | |
|---|---|---|---|---|
| CN | 208370740 | U | 1/2019 | |
| CN | 210044177 | U | 11/2020 | |
| DE | 202011100374 | U1 * | 9/2011 | ........... A01K 1/0245 |
| DE | 102011100856 | A1 * | 11/2012 | ........... A01K 1/0245 |
| DE | 202012008977 | U1 * | 3/2014 | ........... A01K 1/0613 |
| EP | 1665926 | A2 | 7/2006 | |
| KR | 101316604 | B1 | 6/2013 | |

* cited by examiner

LIVESTOCK TRANSPORT IMPLEMENT

TECHNICAL FIELD

The subject innovation pertains to an implement for transporting an animal. More specifically, the innovation relates to an implement that is configured to be mounted on a self-propelled vehicle for transporting an animal that cannot move to an alternate location under its own power.

BACKGROUND

Implements for transporting animals are known in the art. Typical animal transport implements include a platform defining a platform perimeter for supporting the animal thereon. An implement frame extends around an entirety of the platform perimeter such that the implement frame defines a predetermined area upon the platform for positioning the animal during a transport event. However, animal transport implements known in the art are not configured or adapted for easily and efficiently moving injured or ill animals into and out of the predetermined area, and traditional animal transport implements often require substantial time and labor investments to load and unload the animal, particularly if the animal is injured or ill and cannot move under its own power. The time and labor investment associated with utilizing animal transport implements known in the art can be particularly disadvantageous if the animal requires immediate medical assistance.

SUMMARY

An implement for transporting an animal is provided. The implement comprises a platform for supporting the animal thereon. The platform further comprises a first platform portion and a second platform portion, wherein the first platform portion and the second platform portion collectively define a platform perimeter therearound. An implement frame extends around a substantial entirety of the platform perimeter such that the implement frame defines a predetermined area configured to receive the animal during a transport event. The implement frame further comprises an anterior frame section extending from the first platform portion. The implement further comprises a hydraulic assembly operatively coupled to the implement frame wherein actuation of the hydraulic assembly selectively transitions the anterior frame section between an open position for selective loading and unloading of the animal and a closed position for containment of the animal during transport.

According to another aspect of the innovation, utilizing the implement of the present disclosure, an animal may be transported via the present method. The present method for transporting the animal includes steps of: loading the animal onto a predetermined containment area of a transport implement at a first predetermined location; transporting the transport implement to a second predetermined location, wherein the second predetermined location is different than the first predetermined location; and unloading the animal in the second predetermined location from the predetermined containment area.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The embodiments set forth in the drawings are illustrative and exemplary in nature and not intended to limit the subject matter. The following detailed description of the illustrative embodiments can be better understood when read in connection with the following drawings, wherein like structures are indicated with like reference numerals and in which.

DETAILED DESCRIPTION

Figure 1:
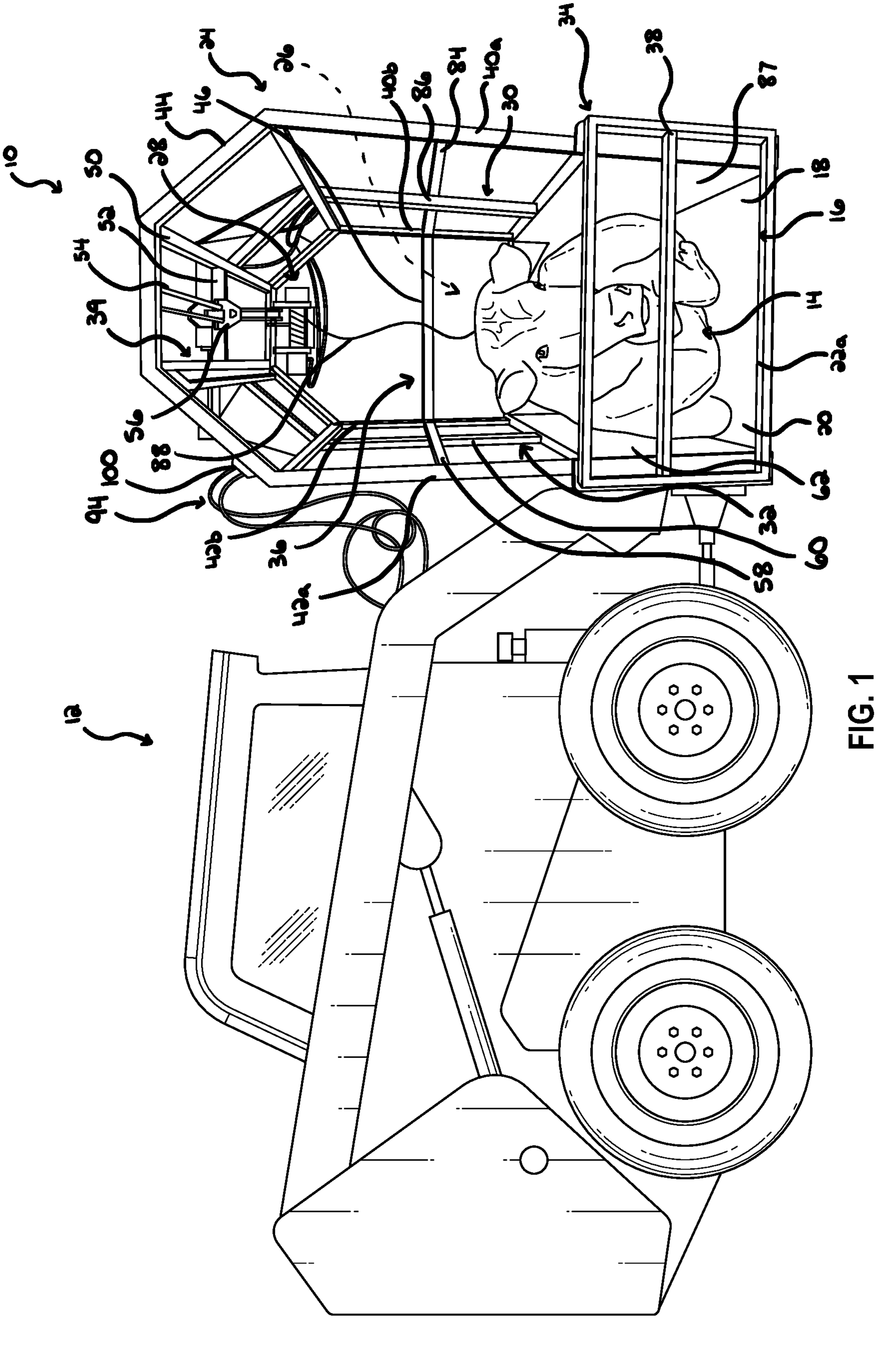
FIG. 1 is a schematic illustration of a side view of an implement mounted on a self-propelled vehicle for transporting an animal according to a first example embodiment of the present disclosure.

While the present disclosure may be described with respect to specific applications or industries, those skilled in the art will recognize the broader applicability of the disclosure.

The terms "a", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

For consistency and convenience, directional adjectives are employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims. Any numerical designations, such as "first" or "second" are illustrative only and are not intended to limit the scope of the disclosure in any way.

The term "longitudinal", as used throughout this detailed description and in the claims, refers to a direction extending a length of a component. The term "forward" or "anterior" is used to refer to the general direction from front to back of the respective component, and the term "rearward" or "posterior" is used to refer to the opposite direction. In some cases, a component may be identified with a longitudinal axis as well as a forward and rearward longitudinal direction along that axis. The longitudinal direction or axis may also be referred to as an anterior-posterior direction or axis.

The term "transverse", as used throughout this detailed description and in the claims, refers to a direction extending a width of a component. The transverse direction or axis may also be referred to as a lateral direction or axis or a mediolateral direction or axis.

The term "vertical", as used throughout this detailed description and in the claims, refers to a direction generally perpendicular to both the lateral and longitudinal directions. The term "upward" or "upwards" refers to the vertical direction pointing towards a top of the component. The term "downward" or "downwards" refers to the vertical direction pointing opposite the upwards direction, toward the bottom of a component. In addition, the term "proximal" refers to a direction that is nearer and the term "distal" refers to a relative position that is further away. Thus, the terms proximal and distal may be understood to provide generally opposing terms to describe relative spatial positions.

Referring to the Figures, wherein like numerals indicate like or corresponding parts throughout the several views, an implement for transporting an animal 14 is shown generally at 10. In a general sense, the implement 10 allows for the transport of an animal 14 that is unable to relocate under its own power, e.g., ill or injured livestock or equine animals, from a first location to a second location. The implement 10 is configured such that the animal may be positioned within a predetermined area 26 upon a selectively enclosable platform 16. The implement is designed such that ingress and egress of the animal 14 to and from the predetermined area 26 may be completed with case and limited stress to the animal 14.

The implement 10 is adapted to be mounted on a self-propelled vehicle 12 with a vehicle hydraulic system, such as a skid-steer loader, a track loader, or a front-end loader, for maneuvering, manipulating, and actuating components of the implement 10 as necessary for loading, transporting, and unloading the animal 14, as shown in FIG. 1.

The implement 10 comprises a platform 16 for supporting the animal 14 thereon. The platform 16 defines a first platform portion 18 and a second platform portion 20, each extending between a pair of opposite edges 22*a*, 22*b*. An implement frame, shown generally at 24, extends upwardly from and around the platform 16 to define a predetermined area 26 upon which the animal 14 is configured to be positioned during transport.

Figure 2:
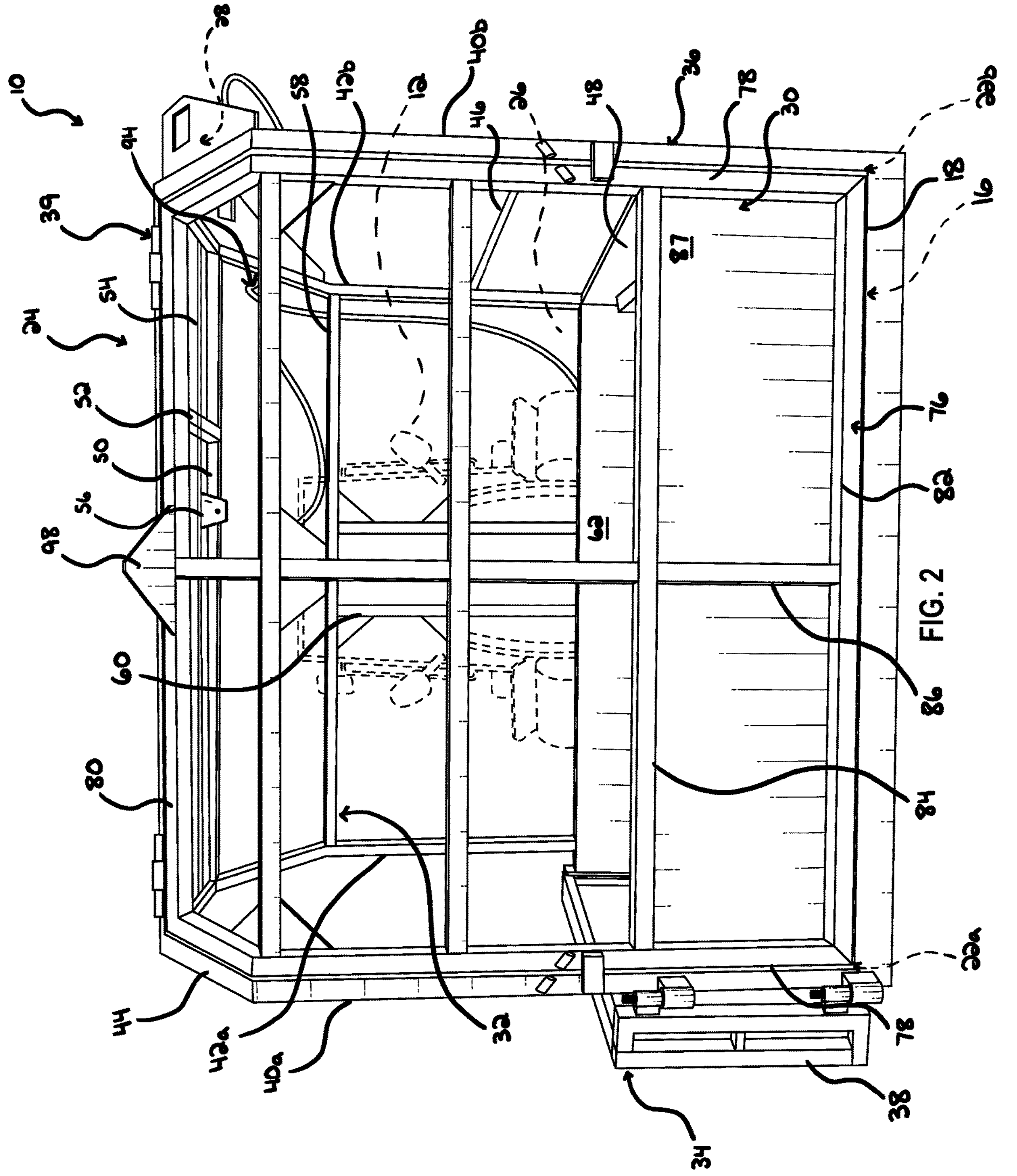
FIG. 2 is a schematic illustration of a front view of the implement of FIG. 1.
Figure 3:
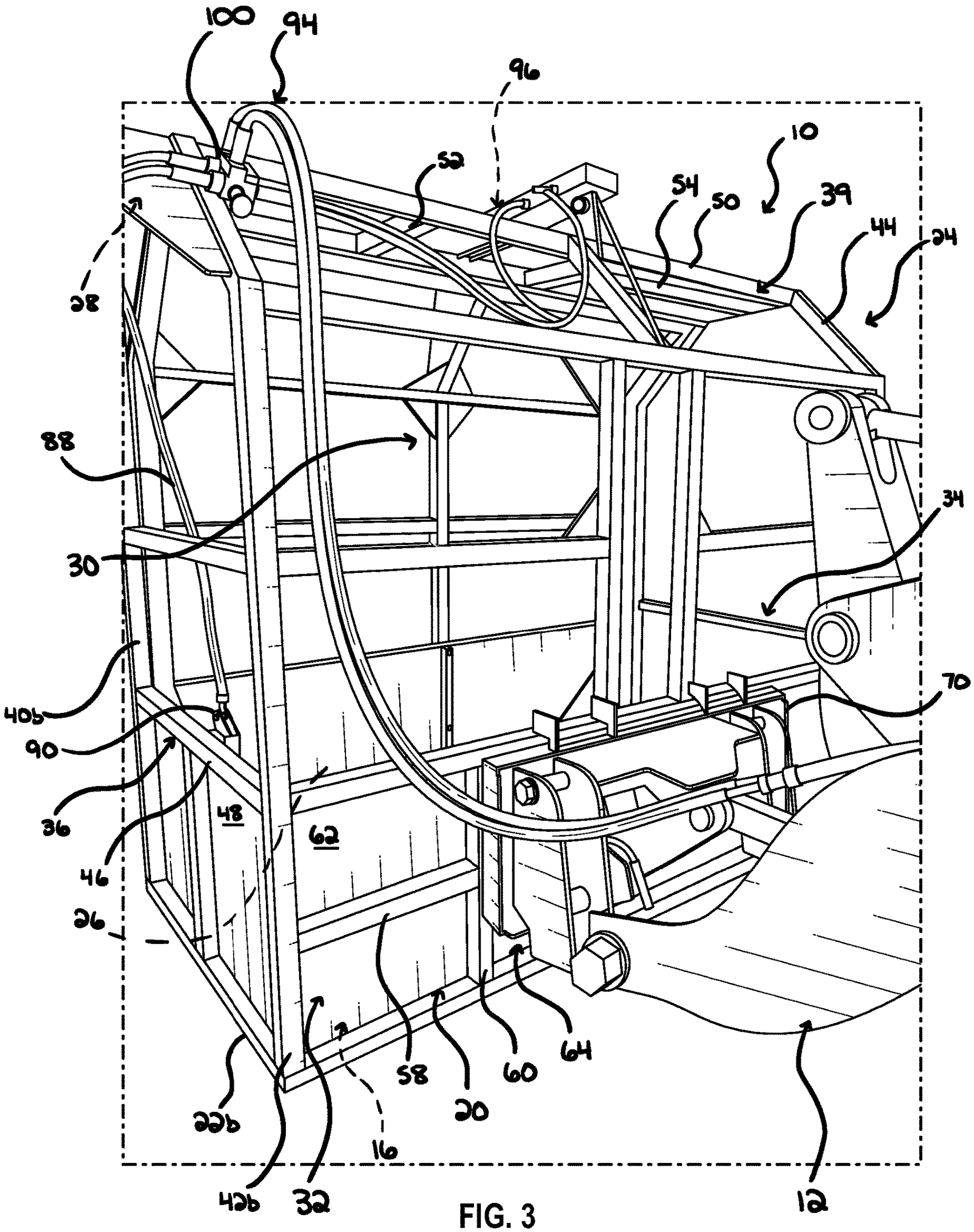
FIG. 3 is a schematic illustration of a fragmentary rear perspective view of the implement of FIG. 1.

Referring to FIGS. 1-3, the implement frame 24 may comprise an anterior frame section 30 extending from the first platform portion 18 and a posterior frame section 32 extending from the second platform portion 20. The anterior frame section 30 is operable between a closed position, as shown in FIGS. 1-4A, in which the anterior frame section 30 is disposed in contact with the first platform portion 18, and an open position, shown in FIG. 4C, in which the anterior frame section 30 is spaced apart from the platform 16, thereby allowing anterior access to and from the predetermined area 26 for the loading and unloading of the animal 14.

Figure 5B:
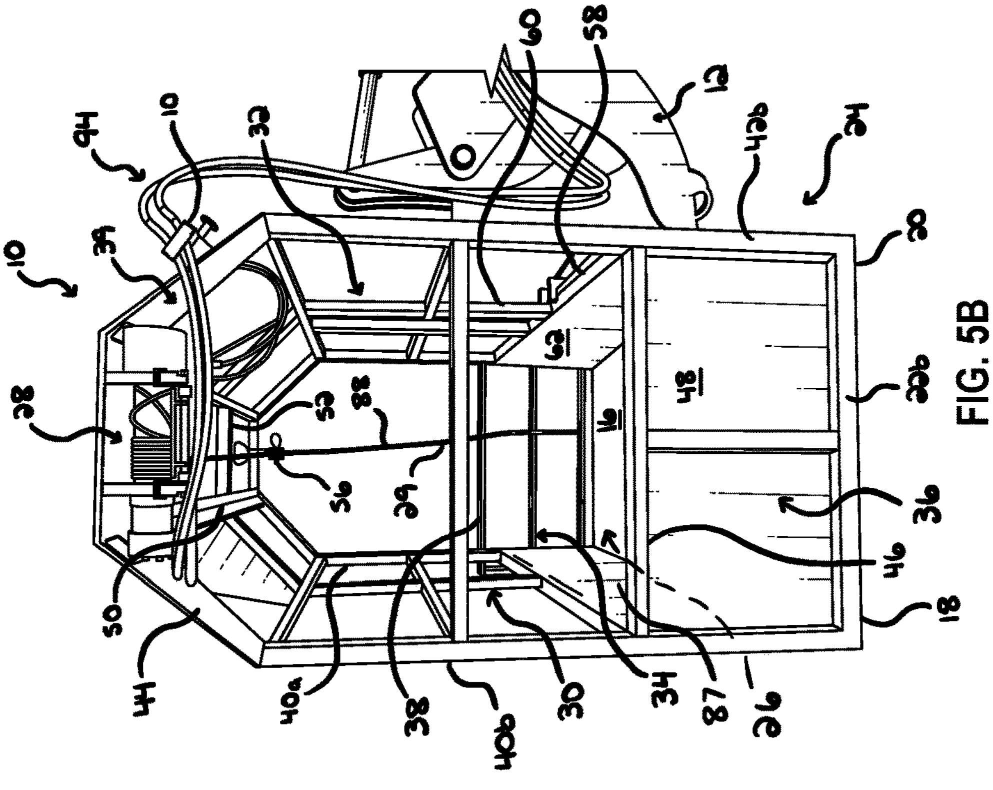
FIG. 5B is a schematic illustration of a fragmentary side view of the implement of FIG. 1 showing a second side frame section of the implement.
Figure 5A:
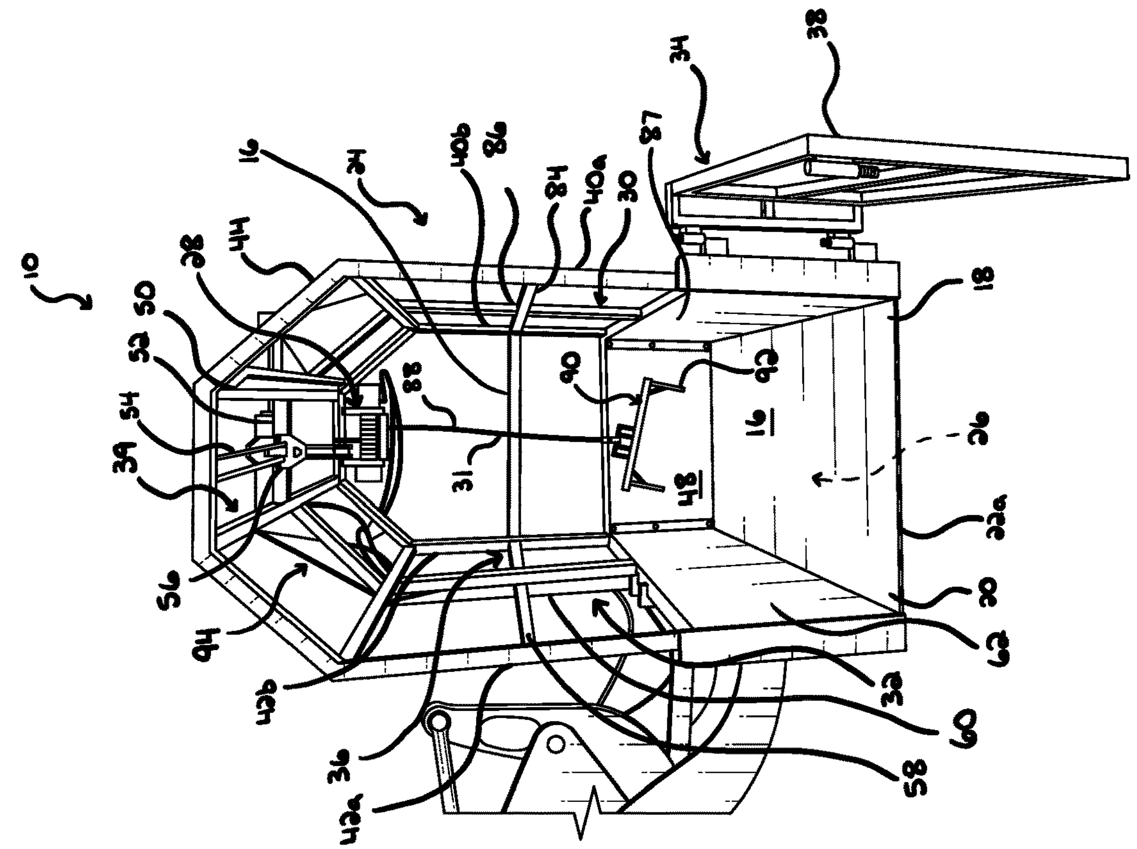
FIG. 5A is a schematic illustration of a fragmentary side view of the implement of FIG. 1 showing a first side frame section of the implement and a gate comprising the same.

Referring to FIGS. 5A and 5B, a first side frame section 34 is coupled to the platform 16 adjacent to one of the opposite edges 22*a* thereof and extends generally between the anterior and posterior frame sections 30, 32. A second side frame section 36 is coupled to the platform 16 adjacent to the other of the opposite edges 22*b* thereof and similarly extends generally between the anterior and posterior frame sections 30, 32. The first side frame section 34 may comprise a gate 38 for selectively allowing lateral access to and from the predetermined area 26. However, it is to be appreciated that either, or both, of the first and second side frame sections may comprise a gate 38 without varying the scope of the invention. Accordingly, when the gate 38 is closed and the anterior frame section 30 is disposed in the closed position, the anterior frame section 30, the posterior frame section 32, and the first and second side frame sections 34, 36 collectively form a barrier about a substantial entirety of a perimeter of the platform 16 to contain the animal 14 within the predetermined area 26 during transport.

Referring back to FIGS. 1 and 2, the implement frame 24 additionally comprises an upper frame section 39 positioned above and spaced apart from the platform 16. The upper frame section 39 may further extend laterally between the first and second side frame sections 34, 36, such that the upper frame section 39 substantially covers the predetermined area 26 between the frame sections 34, 36.

In further detail, the first and second side frame sections 34, 36 may each further comprise a first support 40*a*, 40*b* extending vertically from the first platform portion 18 and a second support 42*a*, 42*b* extending vertically from the second platform portion 20, as shown in FIGS. 5A and 5B. The first and second side frame sections 34, 36 may each further comprise an arcuate upper support 44 extending between each respective pair of first and second supports, 40*a*, 42*a* and 40*b*, 42*b*.

Referring again to FIG. 5A, the gate 38 is pivotally coupled to the first support 40*a* of the first side frame section 34 and configured such that the gate 38 swings toward and away from the corresponding second support 42*a* for selectively allowing lateral access to and from the predetermined area 26. The gate 38 is additionally adapted for releasably fastening to the corresponding second support 42*a* in a manner known in the art, e.g., via a pin connection or a lift-off hinge, to selectively prevent the gate 38 from opening. It is to be appreciated, however, that the gate can secure to the first and second supports in any alternative manner known in the art without varying the scope of the invention.

Referring to FIG. 5B, the second side frame section 36 includes a plurality of intermediate supports 46 extending horizontally between the first and second supports 40*b*, 42*b* thereof for providing further rigidity and strength to the implement frame 24. A substantially planar wall 48 extends vertically from the platform 16 between the first and second supports 40*b*, 42*b* and terminates at one of the plurality of intermediate supports 46 for further containing the animal 14 within the predetermined area 26 during transport and preventing the limbs of the animal 14 from being caught between the first and second supports 40*b*, 42*b* or otherwise extending outside of the platform 16.

Figure 6:
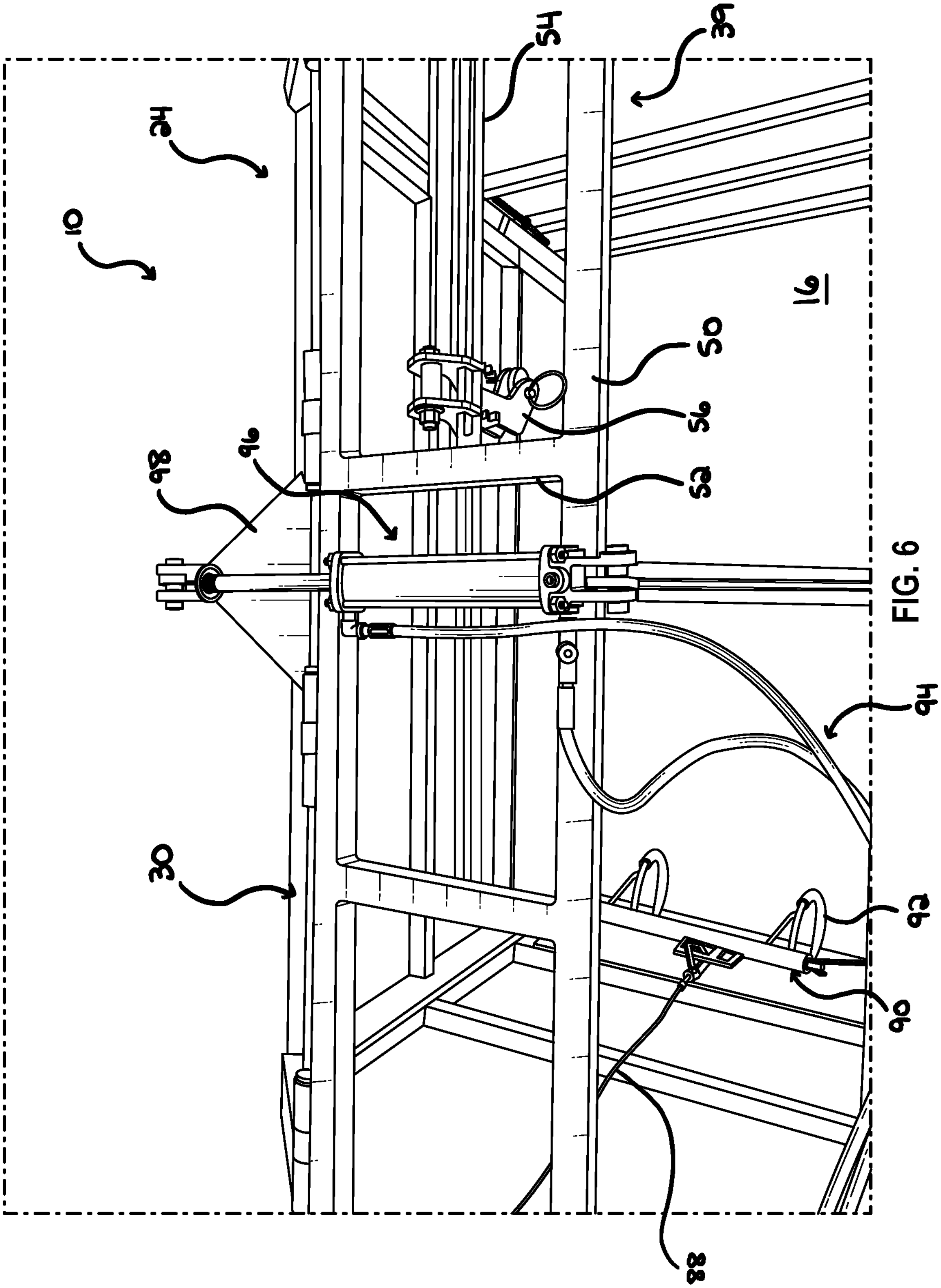
FIG. 6 is a schematic illustration of an enlarged, fragmentary, partial top view of the implement of FIG. 1 showing a hydraulic assembly of the implement.

Referring to FIGS. 5A and 6, the upper frame section 39 may comprise a pair of parallel supports 50 extending between the arcuate upper supports 44 of the first and second side frame sections 34, 36 and a plurality of intermediate supports 52 extending perpendicularly therebetween. The upper frame section 39 may further comprise a pair of upper guiding rails 54 mounted on an underside of the intermediate supports 52 and extending parallel to the pair of parallel supports 50. A pulley 56 of a type known in the art is operatively coupled to the upper guiding rails 54 and selectively repositionable thereon, as described in further detail hereinbelow.

Referring to FIG. 3, the posterior frame section 32 may comprise a plurality of intermediate supports 58 extending laterally between the second supports 42*a*, 42*b* of the first and second side frame sections 34, 36 and a plurality of perpendicular supports 60 bisecting the intermediate supports 58 for providing further rigidity and strength to the implement frame 24. Similar to the wall 48 of the second side frame section 36, a substantially planar wall 62 extends upwardly from the platform 16 between the second supports 42*a*, 42*b* of the first and second side frame sections 34, 36 and terminates at one of the plurality of intermediate supports 52 to assist with containing the animal 14 within the predetermined area 26 during transport.

The posterior frame section 32 further includes a mounting structure, shown generally at 64, positioned between the second supports 42*a*, 42*b* of the first and second side frame sections 34, 36 for mounting the implement 10 on the self-propelled vehicle 12, thereby allowing the self-propelled vehicle 12 to lift, tilt, and otherwise manipulate the orientation of the implement 10 as necessary for loading, transporting, and unloading the animal 14.

Figure 7:
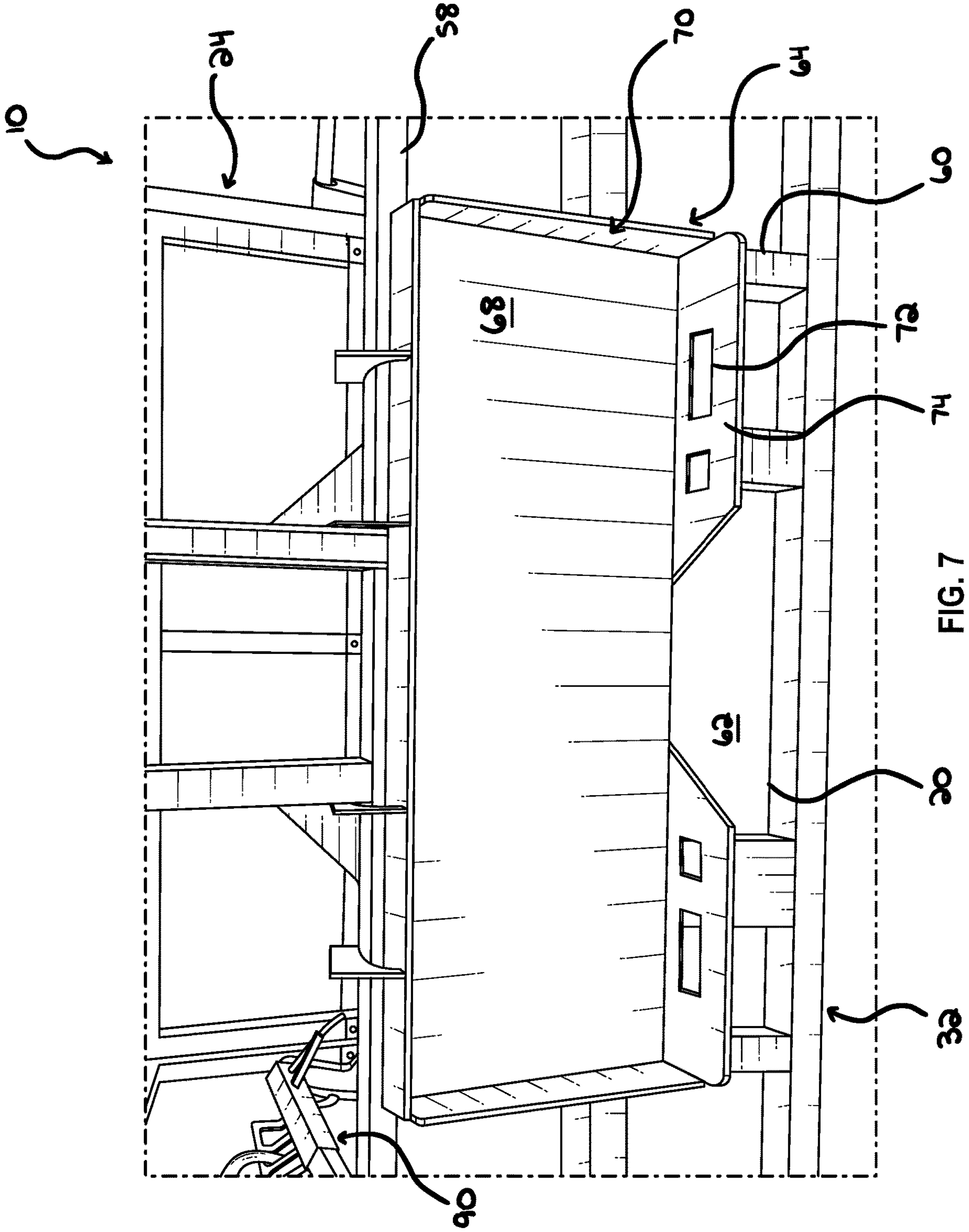
FIG. 7 is a schematic illustration of an enlarged, fragmentary rear view of the implement of FIG. 1 showing a mounting structure on a posterior frame section of the implement.

Referring to FIGS. 3 and 7, the mounting structure 64 is secured to at least one of the plurality of intermediate and perpendicular supports 58, 60 and includes a planar face 68 defining a perimeter therearound. A wall 70 extends around a substantial portion of the perimeter, and a plurality of slots 72 are defined by a bottom portion 74 of the wall 70 for selectively fastening, with corresponding coupling elements, the implement 10 to the self-propelled vehicle 12. For example, the plurality of slots 72 may be adapted and arranged for receiving coupling elements such as pallet forks of a skid-steer loader for selectively fastening the implement 10 thereto. However, it is to be appreciated that the mounting structure may take any alternative form known in the art that is suitable for mounting the implement 10 on the self-propelled vehicle 12 in a manner that allows the self-propelled vehicle 12 to lift, tilt, and otherwise articulate and/or manipulate the orientation of the implement 10.

Figure 4B:
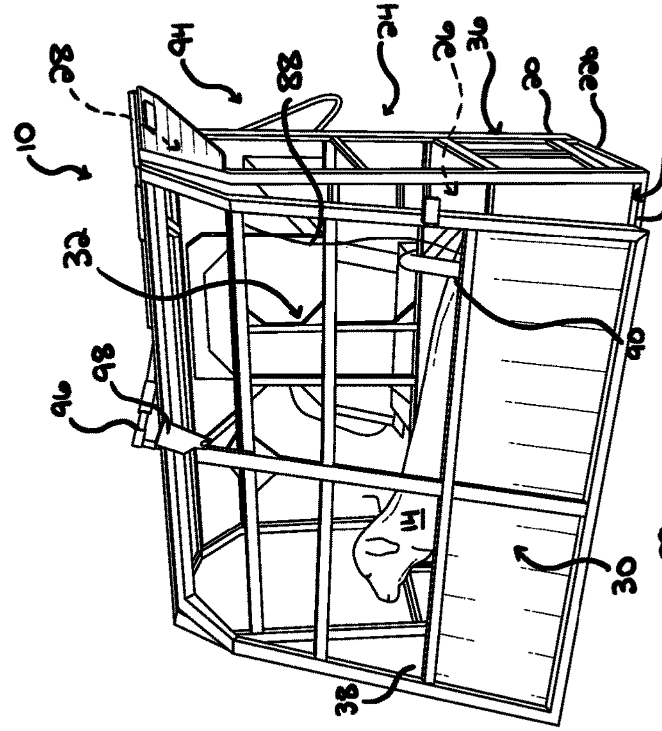
FIG. 4B is a schematic illustration of a fragmentary front perspective view of the implement of FIG. 1 showing the anterior frame section of the implement transitioning from the closed position to an open position.
Figure 4A:
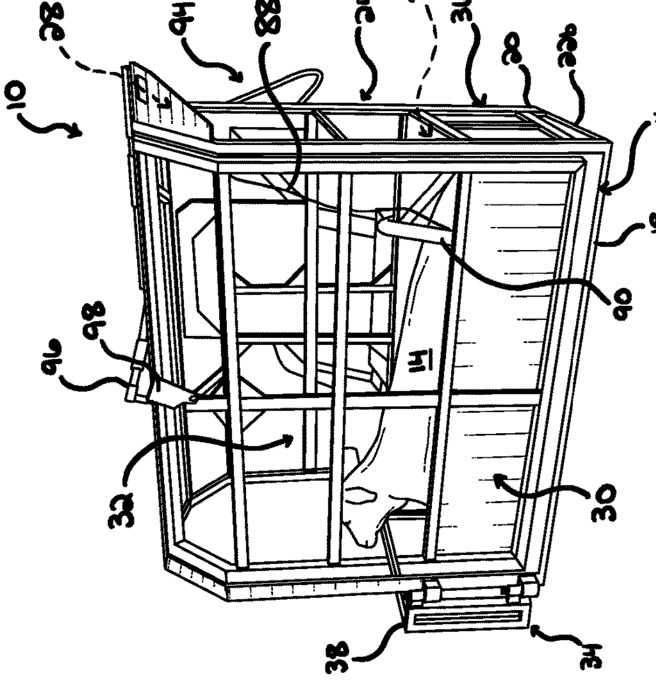
FIG. 4A is a schematic illustration of a fragmentary front perspective view of the implement of FIG. 1 showing an anterior frame section of the implement in a closed position.
Figure 4C:
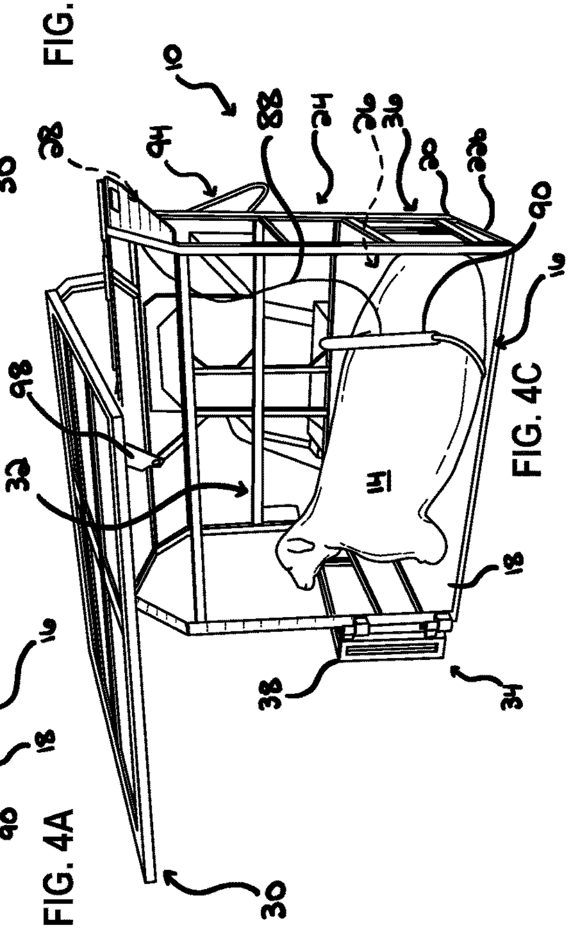
FIG. 4C is a schematic illustration of a fragmentary front perspective view of the implement of FIG. 1 showing the anterior frame section of the implement in the open position.

Referring back to FIG. 2, the anterior frame section 30 is operatively coupled to, and upwardly pivotable around, a first one of the pair of parallel supports 50 of the upper frame section 39, as shown in FIGS. 4A-4C. The anterior frame section 30 may further comprise a perimeter frame 76 extending therearound. The perimeter frame 76 comprises a pair of outer supports 78 formed and positioned such that, when the anterior frame section 30 is disposed in the closed position, each of the pair of outer supports 78 may be positioned adjacent, and extend substantially parallel, to a respective one of the first supports 40*a*, 40*b* of the first and second side frame sections 34, 36. The perimeter frame 76 further includes an upper horizontal support 80 and a lower horizontal support 82, wherein the upper horizontal support 80 may further be positioned adjacent, and extend substantially parallel, to the frontmost one of the pair of parallel supports 50 of the upper frame section 39, and the lower horizontal support 82 is engaged with the first platform portion 18 when the anterior frame section 30 is disposed in the closed position (see FIG. 4A).

Referring again to FIG. 2, the anterior frame section 30 includes a plurality of intermediate supports 84 extending laterally between the pair of outer supports 78 of the perimeter frame 76. A plurality of perpendicular supports 86 are disposed transverse to the plurality of intermediate supports 84 and provide further rigidity and strength to the anterior frame section 30. Similar to the walls 48, 70 of the second side frame section 36 and the posterior frame section 32, a substantially planar wall 87 extends upwardly from the lower horizontal support 82 between the pair of outer supports 78 and terminates at one of the plurality of intermediate supports 84.

Referring to FIGS. 5A and 5B, the implement 10 further includes a first winch assembly 28 mounted on the implement frame 24, wherein the first winch assembly 28 is configured to aid in the loading and unloading of the animal 14 to and from the predetermined area 26. More particularly, the first winch assembly 28 is of a type known in the art and is operatively mounted on the second side frame section 36 adjacent to the arcuate upper support 44 thereof. The first winch assembly 28 comprises a cable element 88 operable between an extended position 29 (see FIG. 5B) and a retracted position 31 (see FIG. 5A). The first winch assembly 28 is operable for securing and moving the animal 14 laterally into the predetermined area 26 through the first side frame section 34. In this way, the cable element 88 is operatively engaged with the pulley 56 such that selective repositioning of the pulley 56 on the upper guiding rails 54 varies an angle of the cable element 88 relative to the animal 14 as is reasonably desired during movement of the animal 14 into the predetermined area 26. An animal attachment element, shown generally at 90, is coupled to the cable element 88 and is adapted to be releasably secured to the animal 14 such that, when the first winch assembly 28 transitions from the extended position 29 to the retracted position 31, the animal 14 is slidably drawn into the predetermined area 26.

As best shown in FIG. 6, the animal attachment element 90 may comprise a one or more loops 92 adapted and arranged to attach to the fore limbs, shoulders, or pelvis of the animal 14. However, it is to be appreciated that the animal attachment element 90 may be configured to accommodate the anatomy of any type of animal 14 having a variety of ailments or injuries desired to be loaded into, and transported by, the implement 10.

Referring to FIGS. 1 and 6, a hydraulic assembly, shown generally at 94, is operatively coupled to the implement frame 24 and adapted to integrate with, and utilize hydraulic pressure generated by, the hydraulic system of the self-propelled vehicle 12 for selective actuation of the hydraulic assembly 94. The hydraulic assembly 94 includes a hydraulic cylinder 96 operable between a retracted position and an extended position for selectively and remotely transitioning the anterior frame section 30 between the open position (see FIG. 4C) and the closed position (see FIG. 4A). As detailed in FIG. 6, the hydraulic cylinder 96 is operatively coupled between a rearmost one of the pair of parallel supports 50 of the upper frame section 39 and an attachment bracket 98 extending outwardly from the upper horizontal support 80 of the anterior frame section 30, such that extension of the hydraulic cylinder 96 transitions the anterior frame section 30 from the open position (see FIG. 4C) to the closed position (see FIG. 4A), and retraction of the hydraulic cylinder 96 transitions the anterior frame section 30 from the closed position (see FIG. 4A) to the open position (see FIG. 4C).

Referring to FIGS. 3 and 5B, the hydraulic assembly 94 further comprises a diverter valve 100 configured to operatively couple each of the first winch assembly 28 and the hydraulic cylinder 96 to the hydraulic system of the self-propelled vehicle 12. As such, actuation of the hydraulic assembly 94 via the hydraulic system of the self-propelled vehicle 12 allows an operator to selectively transition the cable element 88 of the first winch assembly 28 between the extended position 29 and the retracted position 31 and/or the anterior frame section 30 between the open position and the closed position.

Figure 8:
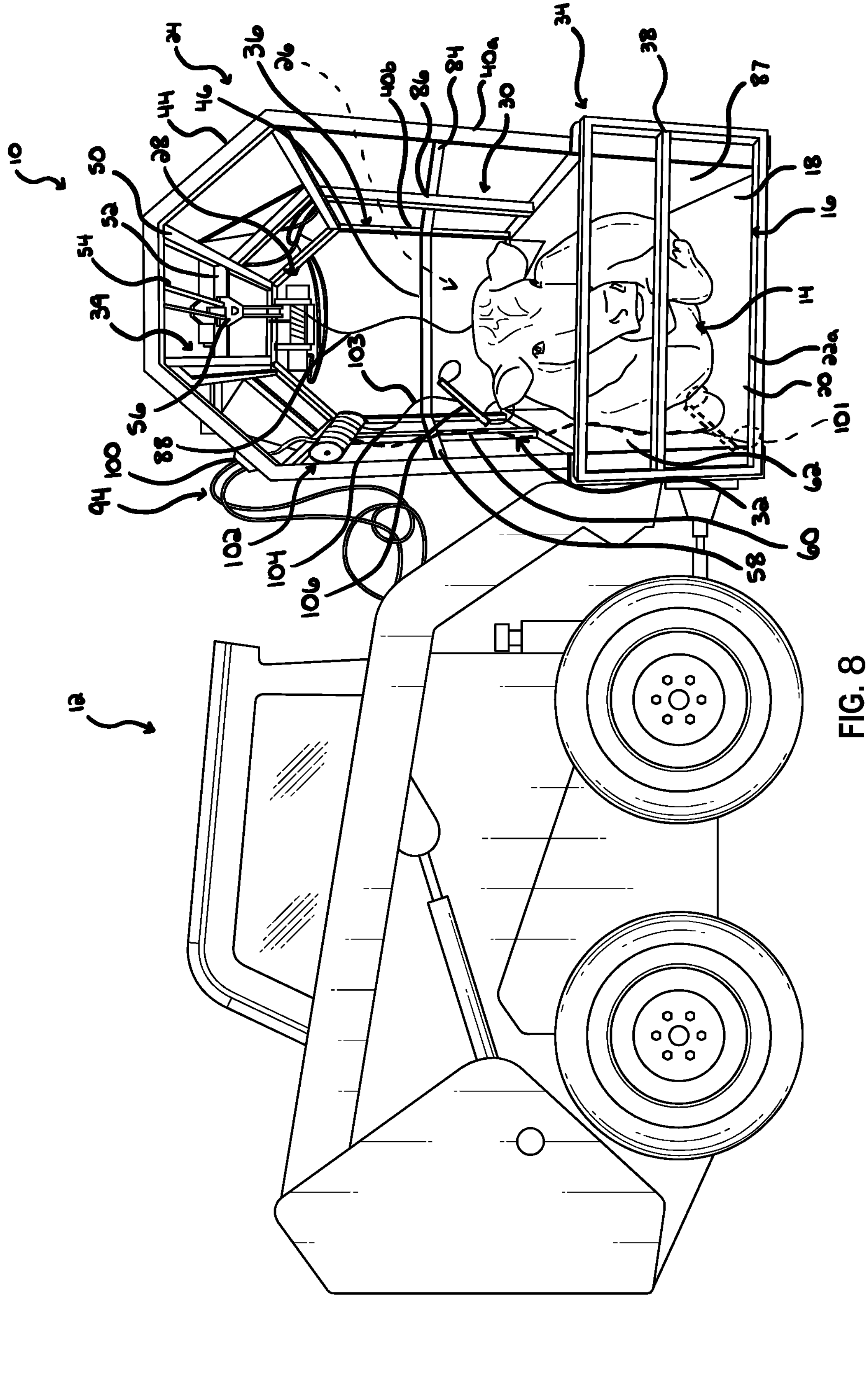
FIG. 8 is a schematic illustration of a side view of an implement mounted on a self-propelled vehicle for transporting an animal according to a second example embodiment of the present disclosure.

A second example embodiment of the implement 10 is shown by example in FIG. 8, wherein a second winch assembly 102 is operatively coupled to the posterior frame section 32 adjacent to the upper frame section 39. The second winch assembly 102 additionally comprises a cable element 104 operable between an extended position 101 and a retracted position 103. The cable element 104 may be secured to the animal 14 via an animal attachment element 106 such that the cable element 104 is operable to move the animal 14 into the predetermined area 26 when the anterior frame section 30 occupies the open position as the cable element 104 transitions from the extended position 101 to the retracted position 103.

The second winch assembly 102 may be further operatively coupled to the hydraulic assembly 94 via the diverter valve 100. Accordingly, actuation of the of the hydraulic assembly 94 via the hydraulic system of the self-propelled vehicle 12 allows the operator to selectively actuate not only the first winch assembly 28 and the hydraulic cylinder 96, as described above, but also the second winch assembly 102 for transitioning the cable element 104 thereof between the extended position 101 and the retracted position 103. It is to be appreciated, however, that the implement 10 can instead omit the first winch assembly 28 in favor of including only the second winch assembly 102 without varying the scope of the invention.

Figure 9A:
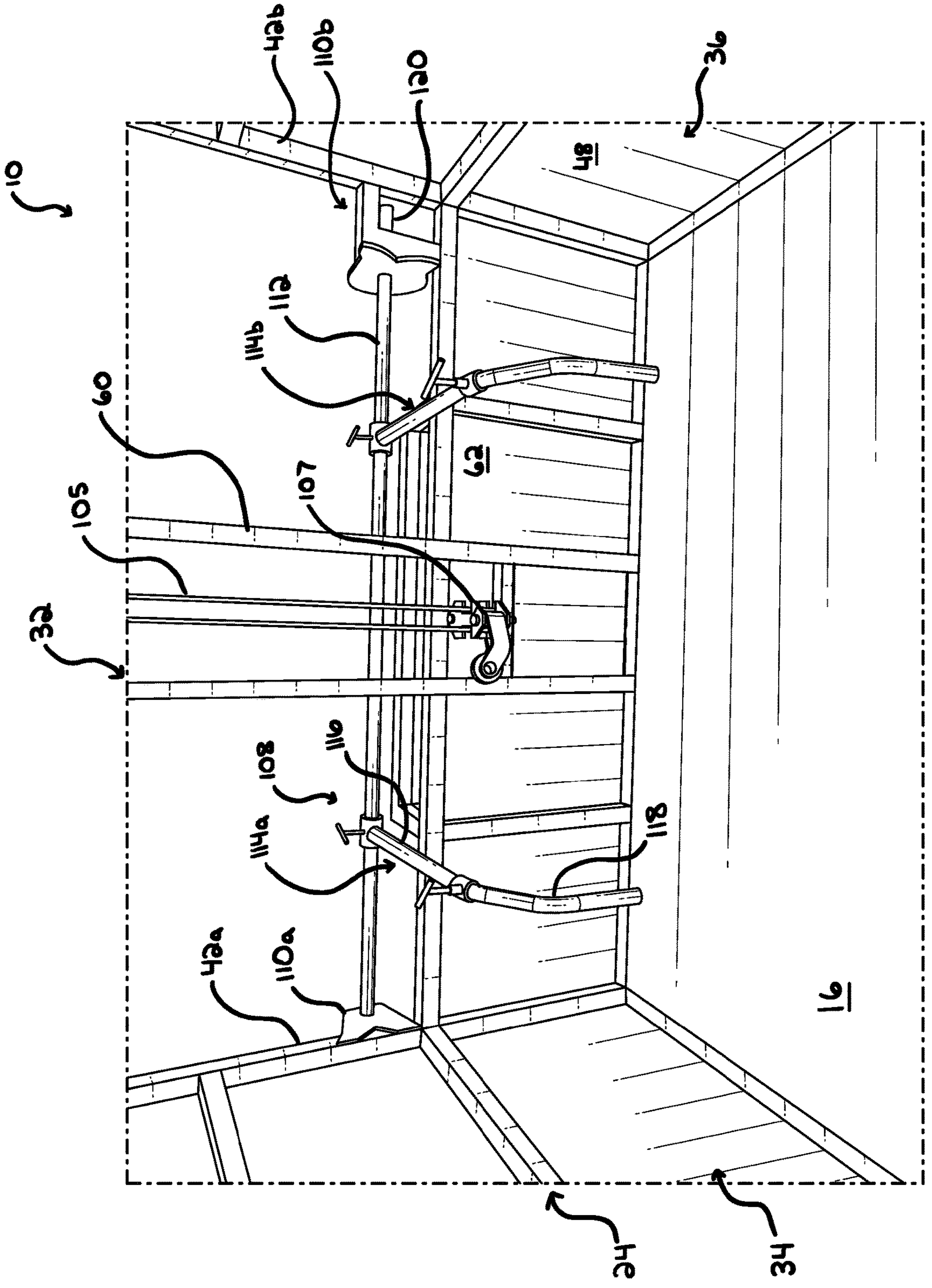
FIG. 9A is a schematic illustration of a fragmentary front perspective view of an implement adapted for mounting on a self-propelled vehicle for transporting an animal according to a third example embodiment of the present disclosure.

Referring to FIG. 9A, the posterior frame section 32 may further include a pair of posterior guiding rails 105 positioned between and extending parallel to the perpendicular supports 60. A pulley 107 of a type known in the art may be operatively coupled to the posterior guiding rails 105 and selectively repositionable thereon for varying the angle of the cable element 104 relative to the animal 14 to assist with pulling the animal 14 into the predetermined area 26.

Figure 9B:
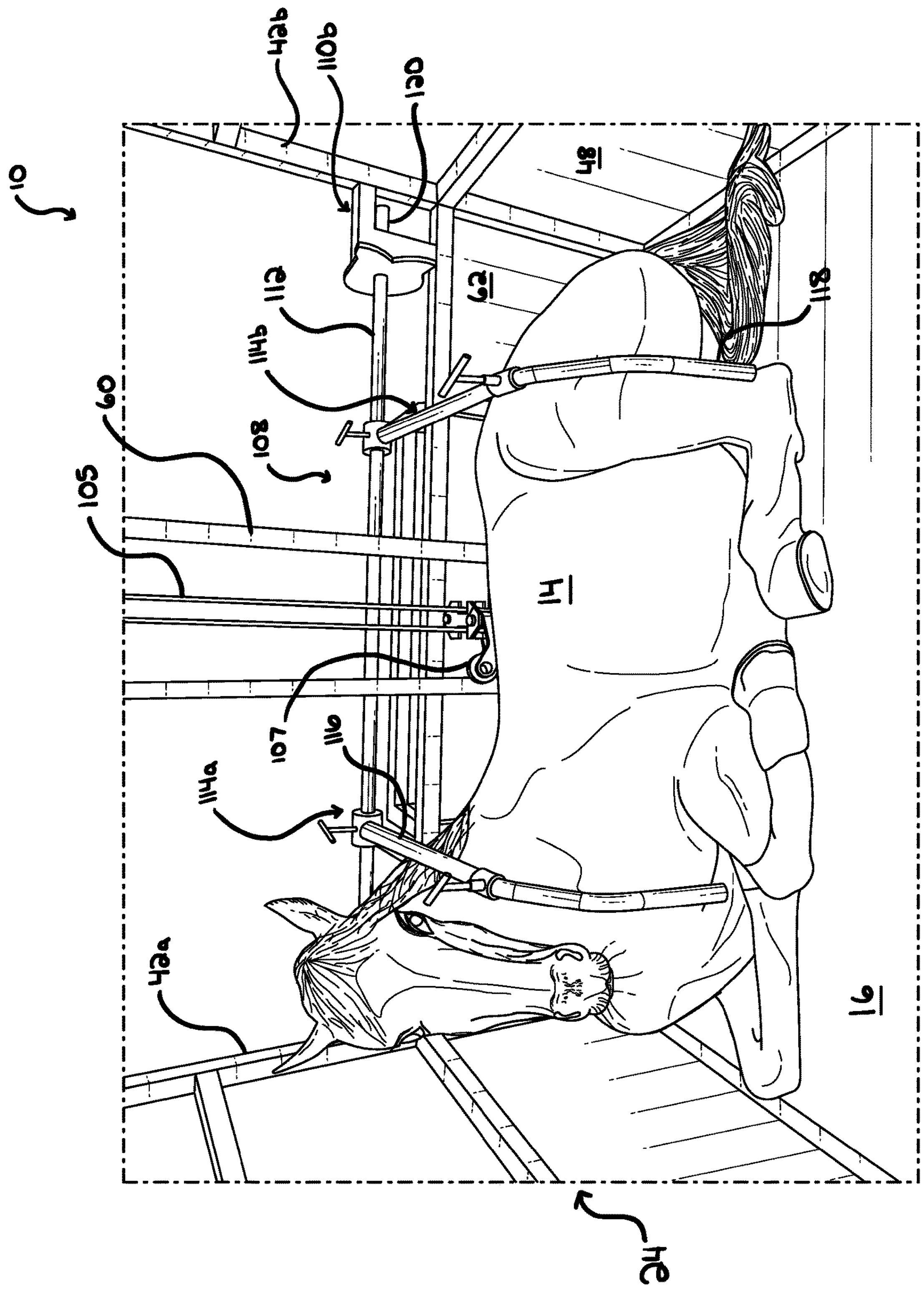
FIG. 9B is a schematic illustration of a fragmentary front perspective view of the implement of FIG. 9A showing an animal restrained via an animal security apparatus.
Figure 10:
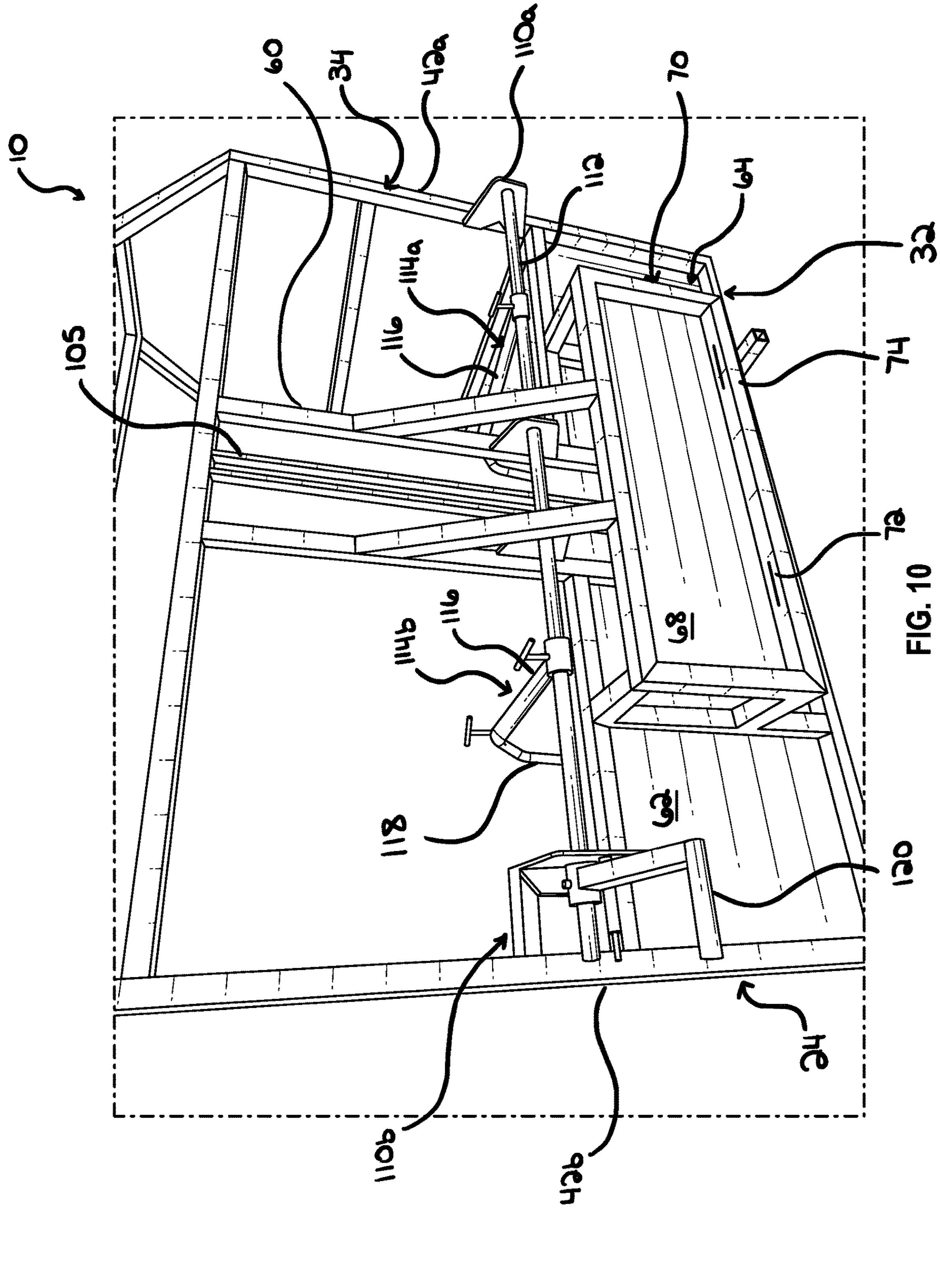
FIG. 10 is a schematic illustration of a fragmentary rear perspective view of the implement of FIGS. 9A and 9B.
Figure 11:
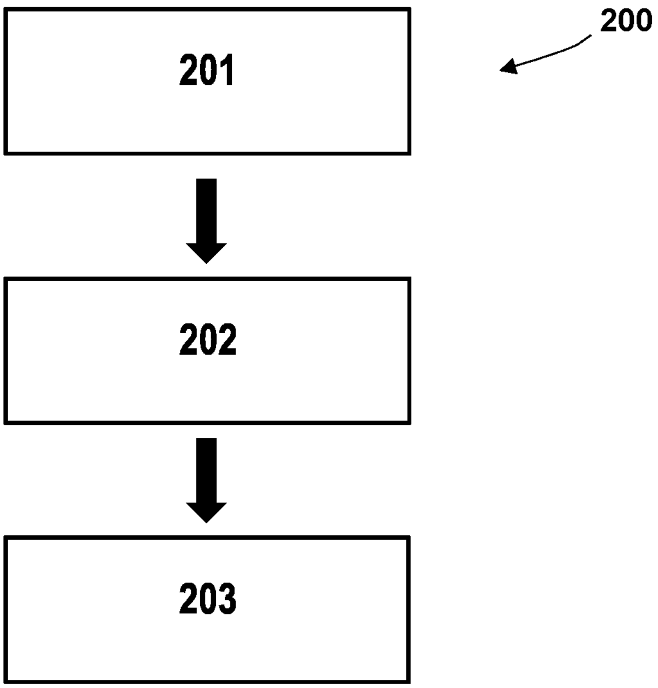
FIG. 11 is a flow chart detailing the step of the present method of transporting an animal.

A third example embodiment of the implement 10 is shown by example in FIGS. 9A, 9B, and 10, wherein the implement 10 further comprises an animal security apparatus 108 positioned adjacent to the anterior frame section 30 and extending over the platform 16 for limiting unintended movement of the animal 14 within the predetermined area 26 during transport. Referring to FIG. 9A, the animal security apparatus 108 comprises a plurality of rotation mounts 110*a*, 110*b* attached to each of the second supports 42*a*, 42*b* adjacent to and above the planar wall 62. A rotation member 112 having a rotational center is operatively coupled between the rotation mounts 110*a*, 110*b* to define a rotational axis A1. A pair of arms 114*a*, 114*b* extend outwardly from the rotation member 112 for restraining the animal 14 within the predetermined area 26, as shown in FIG. 9B. Each of the pair of arms 114*a*, 114*b* is spaced laterally along the rotation member 112 substantially equidistant from the respective rotation mounts 110*a*, 110*b* and comprises a proximal attachment portion 116 affixed to the rotation member 112 and a distal portion 118 extending therefrom. It is contemplated that the proximal attachment portion 116 may be extendable and retractable for increasing and decreasing the distance between the rotation member 112 and the distal curved portion 118 for restraining different sized animals 14 with the animal security apparatus 108.

Referring to FIG. 10, the animal security apparatus 108 may further include a handle 120 for pivoting the pair of arms 114*a*, 114*b* between a raised position for allowing positioning of the animal 14 on the predetermined area 26 and a lowered position, as shown in FIG. 9B, for restraining the animal 14 during transport. The handle 120 may be disposed on the rotation member 112 adjacent to one of the rotation mounts 110*b*, such that a rotational center of the handle 120 is substantially aligned with the rotational center of the rotation member 112. Manual rotation of the handle 120 by the operator about the rotational axis A1 in a first direction D1 (counterclockwise when viewed from FIG. 10) correspondingly rotates the rotation member 112 and, therefore, the pair of arms 114*a*, 114*b* about the rotational axis A1 in the first direction D1 for moving the pair of arms 114*a*, 114*b* from the raised position to the lowered position. Similarly, manual rotation of the handle 120 by the operator about the rotational axis A1 in a second direction D2 (clockwise when viewed from FIG. 10) correspondingly rotates the rotation member 112 and, therefore, the pair of arms 114*a*, 114*b* about the rotational axis A1 in the second direction D2, thereby moving the pair of arms 114*a*, 114*b* from the lowered position to the raised position.

As detailed in the flow charts provided as FIGS. 11-15, in operation, the implement 10 may be utilized to transport an animal 14 that is unable to relocate under its own power, e.g., ill or injured livestock, from a first predetermined location to a second predetermined location different than the first predetermined location. As such, an animal 14 may be so transported via the implement 10 according to the present method 200. Initially, the implement 10 may be positioned laterally adjacent to the animal 14. As detailed in FIG. 11, at step 201, the animal 14 may be loaded onto the predetermined containment area 26 of the implement 10 at a first predetermined location.

Figure 12:
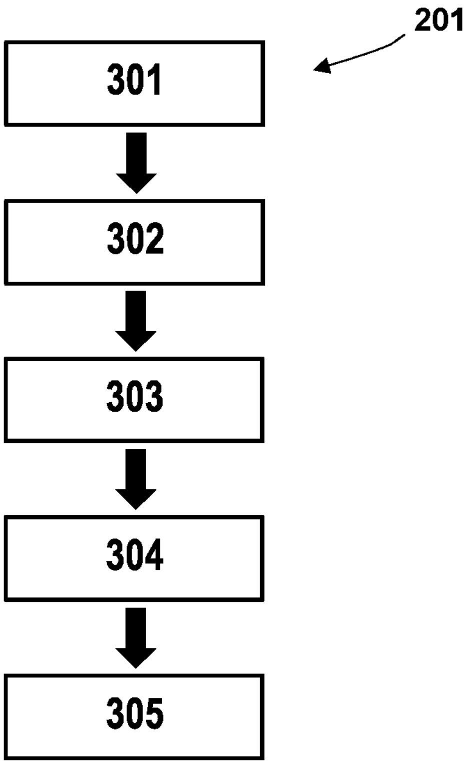
FIG. 12 is a flow chart detailing the step of the present method of loading the animal onto the predetermined containment area of the implement of FIG. 1 according to the first example embodiment.
Figure 13:
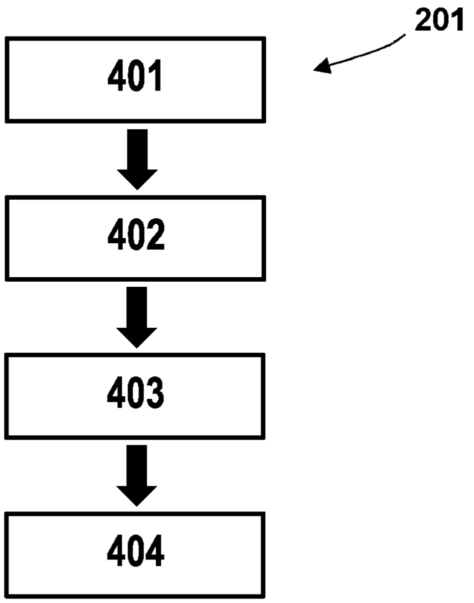
FIG. 13 is a flow chart detailing the step of the present method of loading the animal onto the predetermined containment area of the implement of FIG. 8 according to the second example embodiment.
Figure 14:
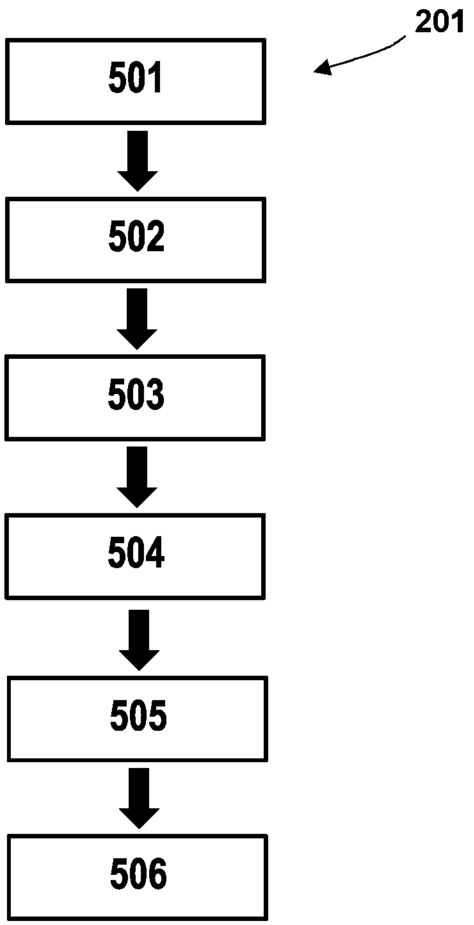
FIG. 14 is a flow chart detailing the step of the present method of loading the animal onto the predetermined containment area of the implement of FIGS. 9A and 9B according to the third example embodiment.
Figure 15:
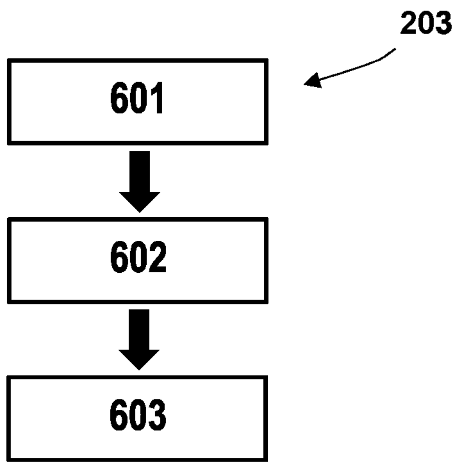
FIG. 15 is a flow chart detailing the step of the present method of unloading the animal from the predetermined containment area of the implement.

The step of loading the animal 14 in the first predetermined location onto the predetermined containment area 26 of the transport implement 10 detailed at 201, may, in a first example embodiment, be further defined in FIG. 12 via sub steps 301-305. At step 301, the gate 38 is opened by an operator. At step 302, the hydraulic assembly 94 is actuated via the hydraulic system of the self-propelled vehicle 12, thereby causing pressurized hydraulic fluid to flow through the diverter valve 100 to and from the first winch assembly 28, and resultantly, the cable element 88 is transitioned from the retracted position 31 to the extended position 29.

At step 303, the animal attachment element 90 is releasably affixed to the animal 14. Once the animal 14 is operatively coupled to the first winch assembly 28 via the animal attachment element 90, at step 304, the hydraulic assembly 94 is again actuated by the hydraulic system of the self-propelled vehicle 12 for transitioning the cable element 88 of the first winch assembly 28 from the extended position 29 back to the retracted position 31, thereby pulling the animal 14 into the predetermined area 26 through the first side frame section 34. The pulley 56 can be repositioned by the operator along the pair of upper guiding rails 54 for varying the angle of the cable element 88 relative to the animal 14 to assist with pulling the animal 14 into the predetermined area 26. Once the animal 14 is fully positioned inside of the predetermined area 26, at step 305, the gate 38 may be closed by the operator.

Alternatively, according to a second example embodiment, the animal 14 may be loaded into the predetermined area 26 via the anterior frame section 30. In this way, the step of loading the animal 14 in a first predetermined location onto the predetermined containment area 26 of a transport implement 10 detailed at 201, may in the second example embodiment be further defined in FIG. 13 via sub steps 401-404. In such scenario, the implement 10 is first positioned behind the injured or ill animal for loading the animal 14 onto the implement 10. At step 401 the hydraulic assembly 94 is actuated via the hydraulic system of the self-propelled vehicle 12. Actuation of the hydraulic assembly 94 causes pressurized hydraulic fluid to flow through the diverter valve 100 to and from the hydraulic cylinder 96, thereby transitioning the hydraulic cylinder 96 from the extended position to the retracted position and correspondingly transitioning the anterior frame section 30 from the closed position to the open position, as shown in FIGS. 4A-4C.

Once the anterior frame section 30 is disposed in the open position, at step 402, the animal attachment element 106 of the second winch assembly 102 may be releasably secured to the animal 14.

At step 403, the hydraulic assembly 94 is again actuated via the hydraulic system of the self-propelled vehicle 12, causing pressurized hydraulic fluid to flow through the diverter valve 100 to and from the second winch assembly 102 for transitioning the cable element 104 thereof from the extended 101 position to the retracted position 103 and correspondingly pulling the animal 14 rearward into the predetermined area 26 through the anterior frame section 30.

Once the animal 14 is completely disposed in the predetermined area 26, at step 404, the hydraulic assembly 94 is once again actuated via the hydraulic system of the self-propelled vehicle 12, thereby causing pressurized hydraulic fluid to flow through the diverter valve 100 to and from the hydraulic cylinder 96. The hydraulic cylinder 96 accordingly transitions from the retracted position back to the extended position, and the anterior frame section 30 correspondingly transitions back to the closed position, as shown in FIGS. 5A-5C.

Alternatively, according to a third example embodiment as shown in FIGS. 9A, 9B, and 10, the animal 14 may be loaded into the predetermined area 26 via the anterior frame section 30 and further secured thereon using the animal security apparatus 108. In this way, the step of loading the animal 14 in a first predetermined location onto the predetermined containment area 26 of a transport implement 10 detailed at 201, may in the third example embodiment be further defined in FIG. 14 via sub steps 501-506.

In such scenario, the implement 10 is first positioned behind the injured or ill animal for loading the animal 14 onto the implement 10. At step 501 the hydraulic assembly 94 is actuated via the hydraulic system of the self-propelled vehicle 12. Actuation of the hydraulic assembly 94 causes pressurized hydraulic fluid to flow through the diverter valve 100 to and from the hydraulic cylinder 96, thereby transitioning the hydraulic cylinder 96 from the extended position to the retracted position and correspondingly transitioning the anterior frame section 30 from the closed position to the open position, as shown in FIGS. 4A-4C.

Once the anterior frame section 30 is disposed in the open position, at step 502, the handle 120 of the animal security apparatus 108 is rotated by an operator about the rotational axis A1 in the second direction D2, thereby rotating the rotation member 112 and correspondingly pivoting the pair of arms 114*a*, 114*b* about the rotational axis A1 in the second direction D2 to move the pair of arms 114*a*. 114*b* from the lowered position to the raised position. At step 503, the animal attachment element 106 of the second winch assembly 102 may be releasably secured to the animal 14.

At step 504, the hydraulic assembly 94 is again actuated via the hydraulic system of the self-propelled vehicle 12, causing pressurized hydraulic fluid to flow through the diverter valve 100 to and from the second winch assembly 102 for transitioning the cable element 104 thereof from the extended position 101 to the retracted position 103 and correspondingly pulling the animal 14 rearward into the predetermined area 26 through the anterior frame section 30.

Once the animal 14 is completely disposed in the predetermined area 26 adjacent to the posterior frame section 32, at step 505, the handle 120 of the animal security apparatus 108 is rotated by the operator about the rotational axis A1 in the first direction D1. Rotation of the handle 120 in the first direction D1 correspondingly rotates the rotation member 112 and pivots the pair of arms 114*a*, 114*b* about the rotational axis A1 in the first direction D1 to move the pair of arms 114*a*, 114*b* from the raised position to the lowered position, as shown in FIG. 9B, thereby restraining and further securing the animal 14 within the predetermined area 26.

After the animal 14 is fully secured in the predetermined area 26, at step 506, the hydraulic assembly 94 is once again actuated via the hydraulic system of the self-propelled vehicle 12, thereby causing pressurized hydraulic fluid to flow through the diverter valve 100 to and from the hydraulic cylinder 96. The hydraulic cylinder 96 accordingly transitions from the retracted position back to the extended position, and the anterior frame section 30 correspondingly transitions back to the closed position, as shown in FIGS. 5A-5C.

Referring back to FIG. 11, once the animal 14 is loaded onto the predetermined containment area 26 of the transport implement 10 detailed at 201, the implement 10 may be lifted sufficiently above the ground by the self-propelled vehicle 12, such that, at step 202, the animal 14 may be transported within the implement 10 to a second predetermined location, such as a veterinary hospital or clinic.

Once the animal 14 arrives at the second predetermined location, at step 203, the animal 14 may be unloaded from the predetermined containment area 26. The step of unloading the animal 14 from the predetermined containment area 26 at the second predetermined location, detailed at 203, may be further defined in FIG. 15 via sub steps 601-603.

First, at step 601, the hydraulic assembly 94 may be actuated via the hydraulic system of the self-propelled vehicle 12, such that the actuation thereof causes pressurized hydraulic fluid to flow through the diverter valve 100 to and from the hydraulic cylinder 96, thereby transitioning the hydraulic cylinder 96 from the extended position to the retracted position and correspondingly transitioning the anterior frame section 30 from the closed position (see FIG. 4A) to the open position (see FIG. 4C), as shown in FIGS. 4A-4C.

At step 602, the self-propelled vehicle 12 is then utilized to lift and manipulate the orientation of the implement 10 relative to the ground such that the first platform portion 18 is engaged with the ground and the second platform portion 20 is spaced above the ground, thereby causing the animal 14 to slide off the platform 16 and out of the predetermined area 26 through the anterior frame section 30.

Once the animal 14 has completely exited the predetermined area 26, at step 603, the hydraulic assembly 94 is again actuated via the hydraulic system of the self-propelled vehicle 12, thereby causing pressurized hydraulic fluid to flow through the diverter valve 100 to and from the hydraulic cylinder 96. The hydraulic cylinder 96 transitions from the retracted position back to the extended position, and the anterior frame section 30 correspondingly transitions from the open position (see FIG. 4C) to the closed position (see FIG. 4A).

Figure 16:
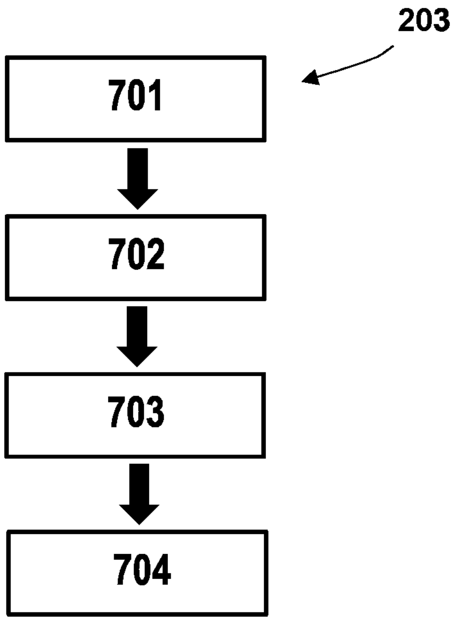
FIG. 16 is a flow chart detailing the step of the present method of unloading the animal from the predetermined containment area of the implement of FIGS. 9A and 9B according to the third example embodiment.

Alternatively, the step of unloading the animal 14 from the predetermined containment area 26 at the second predetermined location, detailed at 203, may in the third example embodiment be further defined in FIG. 16 via sub steps 701-704. At step 701, the hydraulic assembly 94 may be actuated via the hydraulic system of the self-propelled vehicle 12, such that the actuation thereof causes pressurized hydraulic fluid to flow through the diverter valve 100 to and from the hydraulic cylinder 96, thereby transitioning the hydraulic cylinder 96 from the extended position to the retracted position and correspondingly transitioning the anterior frame section 30 from the closed position (see FIG. 4A) to the open position (see FIG. 4C), as shown in FIGS. 4A-4C.

At step 702, the handle 120 of the animal security apparatus 108 is rotated by the operator about the rotational axis A1 in the second direction D2. Rotation of the handle 120 in the second direction D2 correspondingly rotates the rotation member 112 and pivots the pair of arms 114*a*, 114*b* about the rotational axis A1 in the second direction D2 to move the pair of arms 114*a*. 114*b* from the lowered position to the raised position, thereby releasing the animal 14 from the animal security apparatus 108. Then, at step 703, the self-propelled vehicle 12 is utilized to lift and manipulate the orientation of the implement 10 relative to the ground such that the first platform portion 18 is engaged with the ground and the second platform portion 20 is spaced above the ground, thereby causing the animal 14 to slide off the platform 16 and out of the predetermined area 26 through the anterior frame section 30 that occupies the open position as shown in FIG. 4C.

Once the animal 14 has completely exited the predetermined area 26, at step 704, the hydraulic assembly 94 is again actuated via the hydraulic system of the self-propelled vehicle 12, thereby causing pressurized hydraulic fluid to flow through the diverter valve 100 to and from the hydraulic cylinder 96. The hydraulic cylinder 96 transitions from the retracted position back to the extended position, and the anterior frame section 30 correspondingly transitions from the open position (shown in FIG. 4C) to the closed position (shown in FIG. 4A).

While various embodiments have been described, the description is intended to be exemplary, rather than limiting and it will be apparent to those of ordinary skill in the art that many more embodiments and implementations are possible that are within the scope of the embodiments. While some of the best modes and other embodiments for carrying out the present teachings have been described in detail, various alternative designs and embodiments exist for practicing the present teachings defined in the appended claims. Any feature of any embodiment may be used in combination with or substituted for any other feature or element in any other embodiment unless specifically restricted. Accordingly, the embodiments are not to be restricted except in light of the attached claims and their equivalents. Many modifications and variations of the present invention are possible in light of the above teachings and within the scope of the attached claims. It is, therefore, to be understood that within the scope of the appended claims, the invention may be practiced other than as specifically described.

Benefits, other advantages, and solutions to problems, and any element or elements that may cause any benefit, advantage, or solution to occur or become more pronounced, however, are not to be construed as critical, required, or essential features or elements of any or all of the claims, unless such benefits, advantages, solutions, or elements are expressly stated in such claims.

What is claimed is:

1. An implement for transporting an animal, the implement comprising:

a platform for supporting the animal thereon, the platform defining a platform perimeter and comprising a first platform portion and a second platform portion;

an implement frame extending around a substantial entirety of the platform perimeter such that the implement frame defines a predetermined area upon the first platform portion and the second platform portion, the implement frame further comprising:

an anterior frame section extending from the first platform portion, wherein the anterior frame section is operable between a closed position and an open position;

a posterior frame section that extends from the second platform portion;

a plurality of side frame sections extending between the anterior frame section and the posterior frame section; and an upper frame section spaced above the platform and extending between the plurality of side frame sections for covering the predetermined area;

a first winch assembly operatively coupled to the implement frame for moving the animal into the predetermined area, wherein the first winch assembly is operable between an extended position and a retracted position;

a hydraulic assembly operatively coupled to the implement frame, wherein actuation of the hydraulic assembly selectively transitions the anterior frame section between the open position and the closed position and selectively transitions the first winch assembly from the extended position to the retracted position, wherein the hydraulic assembly comprises:

a hydraulic cylinder operatively coupled between the upper frame section and the anterior frame section for selectively transitioning the anterior frame section between the open position and the closed position; and a first diverter valve operatively coupled between the first winch assembly and the hydraulic cylinder; and wherein the animal is positioned within the predetermined area during a transport event.

2. The implement of claim 1 further comprising a second winch assembly operatively coupled to the implement frame for moving the animal into the predetermined area, wherein the second winch assembly is operable between an extended position and a retracted position.

3. The implement of claim 2 further comprising an animal security apparatus operatively coupled to the posterior frame section for restraining the animal within the predetermined area during the transport event.

4. The implement of claim 2 wherein the second winch assembly is integrated with the hydraulic assembly such that actuation of the hydraulic assembly transitions the second winch assembly between the extended position and the retracted position.

5. The implement of claim 4 wherein the hydraulic assembly further comprises a second diverter valve operatively coupled between the first winch assembly and the second winch assembly.

6. The implement of claim 5 wherein at least one of the plurality of side frame sections comprises a gate for selectively allowing access to and from the predetermined area.

7. The implement of claim 6 wherein:

the first winch assembly is operably coupled to the implement frame adjacent to one of the plurality of side frame sections for pulling the animal into the predetermined area via the gate; and wherein the second winch assembly is operatively coupled to the implement frame adjacent to the posterior frame section for pulling the animal into the predetermined area via the anterior frame section when the anterior frame section is disposed in the open position.

8. The implement of claim 1 wherein:

the posterior frame section comprises a mounting structure; and the mounting structure is configured to be operatively coupled to a self-propelled vehicle.

9. The implement of claim 8, wherein the self-propelled vehicle is at least one of a skid-steer loader, a track loader, or a front-end loader, and wherein the self-propelled vehicle comprises a vehicle hydraulic system configured to selectively actuate the hydraulic assembly of the implement.

10. The implement of claim 8 wherein the upper frame section further comprises a plurality of guiding rails with a pulley operatively coupled thereto and selectively repositionable thereon.

11. The implement of claim 10 wherein the first winch assembly comprises a cable element operatively engaged with the pulley, and wherein the implement further comprises an animal attachment element coupled to the cable element such that the animal attachment element is adapted to be selectively affixed to the animal to assist with moving the animal into the predetermined area when the first winch assembly is transitioned from the extended position to the retracted position.

12. The implement of claim 1 wherein when the anterior frame section is in the open position, the anterior frame section is spaced apart from the platform; and wherein when the anterior frame section is in the closed position, the anterior frame section is disposed in contact with the first platform portion, such that the anterior frame section, the posterior frame section, and the plurality of side frame sections collectively form a barrier about the substantial entirety of the platform perimeter to contain the animal within the predetermined area during the transport event.

* * * * *